(12) United States Patent
Gates et al.

(10) Patent No.: US 9,996,311 B2
(45) Date of Patent: Jun. 12, 2018

(54) EFFICIENT COMMUNICATION INTERFACE FOR CASTING INTERACTIVELY CONTROLLED VISUAL CONTENT

(71) Applicant: Roku, Inc.

(72) Inventors: Gregory S. Gates, Saratoga, CA (US); Harold Sun, Tigard, OR (US); Michael Chin-Ming Fu, Cupertino, CA (US)

(73) Assignee: ROKU, INC., Los Gatos, CA (US)

( * ) Notice: Subject to any disclaimer, the term of this patent is extended or adjusted under 35 U.S.C. 154(b) by 0 days. days.

(21) Appl. No.: 15/070,800

(22) Filed: Mar. 15, 2016

(65) Prior Publication Data
US 2017/0269895 A1    Sep. 21, 2017

(51) Int. Cl.
*G09G 5/00*    (2006.01)
*G06F 3/14*    (2006.01)
*G06T 3/00*    (2006.01)
*G06T 3/20*    (2006.01)
*G06T 3/40*    (2006.01)

(52) U.S. Cl.
CPC .......... *G06F 3/1454* (2013.01); *G06T 3/0056* (2013.01); *G06T 3/20* (2013.01); *G06T 3/4092* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,561,720 A * | 10/1996 | Lellmann | ............... | G06K 9/342 382/178 |
| 2011/0128367 A1* | 6/2011 | Yoshioka | .................. | G06T 1/00 348/79 |
| 2012/0176396 A1* | 7/2012 | Harper | .................. | G06F 3/1431 345/589 |
| 2013/0328747 A1* | 12/2013 | Yoneda | ................. | G06F 3/1423 345/3.1 |

\* cited by examiner

*Primary Examiner* — Kyle Zhai
(74) *Attorney, Agent, or Firm* — Sterne, Kessler, Goldstein & Fox P.L.L.C.

(57) ABSTRACT

System, method, and computer product embodiments for efficiently casting interactively-controlled visual content displayed on a first display screen to a second display screen. In an embodiment, the computing device sends the visual content displayed on the first display screen to a multimedia device for displaying on the second display screen. Upon receipt of an instruction that visually manipulates how the visual content is displayed on the first display screen, the computing device generates a command representative of the received instruction. The command may specify a positional relationship between the center of the first display screen and the visual content displayed on the first display screen. Then, the computing devices sends the command to the multimedia device that causes the second display screen to display the visual content according to the positional relationship.

20 Claims, 4 Drawing Sheets

EFFICIENT COMMUNICATION INTERFACE FOR CASTING INTERACTIVELY CONTROLLED VISUAL CONTENT

FIELD

This disclosure is generally directed to a casting visual content on a device screen.

BACKGROUND

Recent advances in camera technology allow content consumers to take high resolution pictures or videos on a mobile device. Mobile device screens, however, are typically significantly smaller than television (TV) display screens, which may be greater than 24 inches diagonally. So a content consumer may want to cast, for example, the image from his mobile device across a wireless network to the TV having the much larger screen for display.

One well-known technique to display the corresponding image on the TV screen is to "mirror" the mobile device's display screen. In typical implementations, successive captures (e.g., image frames) of the mobile device screen are compressed and sent over the wireless network to the TV. The TV receives and decompresses each received frame before displaying on the TV screen.

But conventional "mirroring" technologies are bandwidth intensive as the mobile device needs to continuously transfer screen captures to the television via the wireless network. "Mirroring" technologies are also resource intensive because the mobile device needs to continuously compress and send image data for display on the TV. Similarly, TVs also expend significant resources to receive and decompress the image data from the mobile devices. This resource-intensive technology further shortens battery life, decreases responsiveness, and generates excessive heat for both the mobile device and the television.

BRIEF SUMMARY

Provided herein are system, method, apparatus, and computer program product embodiments, and/or combinations and sub-combinations thereof, for providing an efficient communication interface for casting interactively-controlled visual content displayed on a computing device.

In an embodiment, to cast visual content on a second display screen, the computing device sends the visual content displayed on a first display screen of the computing device to a multimedia device for displaying on the second display screen. Upon receipt of an instruction that visually manipulates how the visual content is displayed on the first display screen, the computing device generates a command representative of the received instruction. The command may specify a positional relationship between the center of the first display screen and the visual content displayed on the first display screen. Then, the computing device sends the command to the multimedia device that causes the second display screen to display the visual content according to the positional relationship.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present disclosure and, together with the description, further serve to explain the principles of the disclosure and to enable one of ordinary skill in the art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
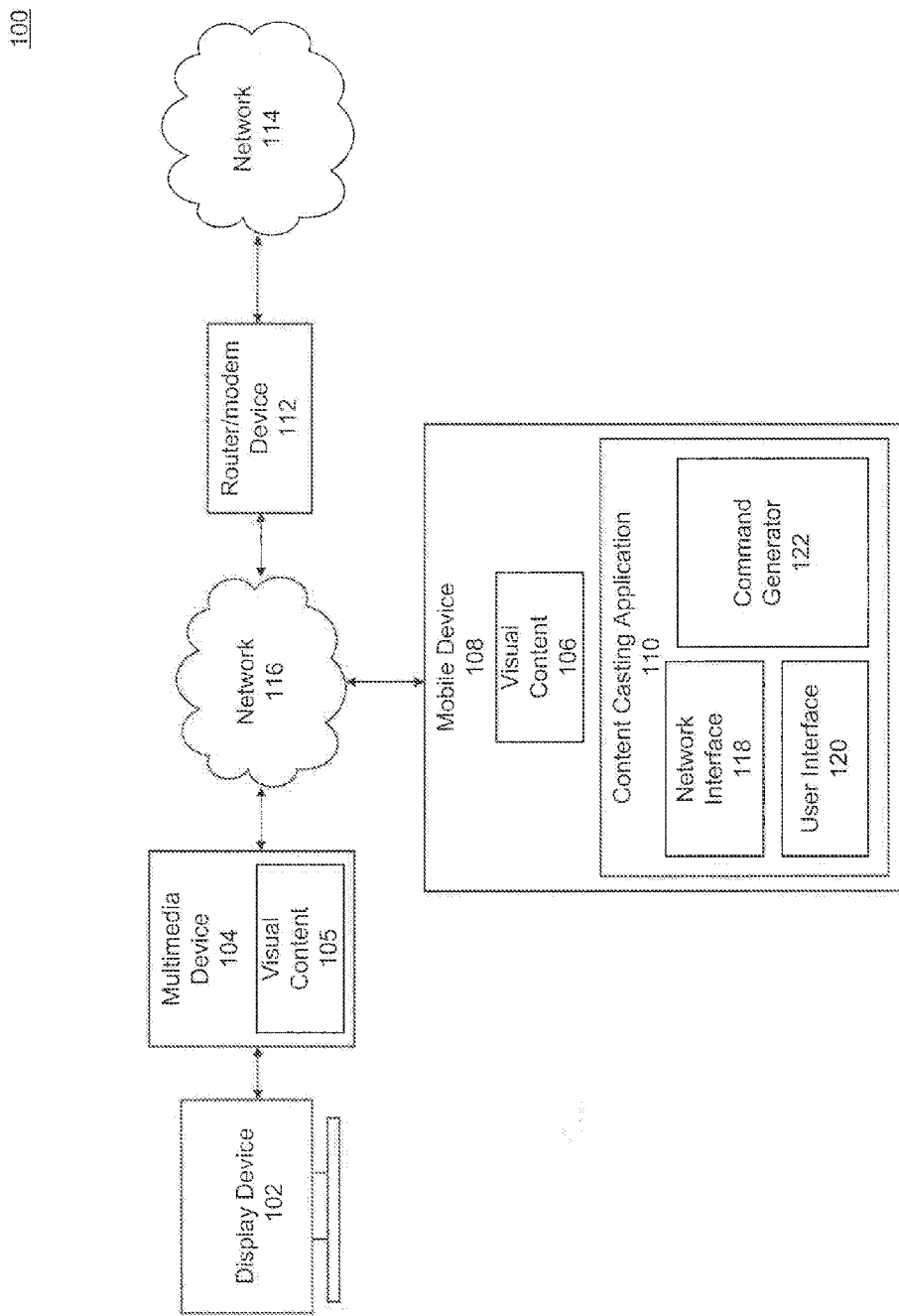
FIG. 1 is a block diagram of a system for casting visual content, according to an embodiment.

FIG. 1 illustrates a system 100 for casting visual content using a bandwidth- and/or resource-efficient communication interface, according to an example embodiment. System 100 includes display device 102, multimedia device 104, mobile device 108, and router/modem device 112. In an embodiment, devices of system 100 may be in close proximity and capable of communicating with each other via network 116 provided by router/modem device 112. Network 116 may be representative of a network, such as a local area network (LAN), provided via wired and/or wireless protocols. As shown, network 116 may be connected to another network, such as the Internet, represented, by network 114, via router/modem device 112. Other communication technologies can also or alternatively be used for network 114 and/or 116 such as but not limited to Bluetooth, Wi-Fi, cellular, etc.

Router/modem device 112 may be one or more networking devices that enables the devices of content casting system 100 (e.g., multimedia device 104, display device 102, or mobile device 108) to access network 114 via network 116. For example, router/modem device 112 may be a single modem device having router capabilities. Network 114 may include any combination of LANs, wide area networks (WANs), the Internet, and/or any other local, regional, and global telecommunications networks. Network 114 may be implemented based on wired and/or wireless communication techniques, protocols, and technologies.

Mobile device 108 may be a portable computing device having a screen that is not preferably- or optimally-sized for viewing visual content 106, such as pictures or video. For example, mobile device 108 may be a lightweight device such as a smartphone, a tablet, a laptop, or another portable device. In an embodiment, the display screen of mobile device 108 is not optimal because it is smaller than the display screen of display device 102.

Visual content 106 may be image or video content that is stored in a memory of mobile device 108. In an embodiment, visual content 106 may be downloaded or cached from a network, such as network 114, via one or more web addresses. In an embodiment, visual content 106 may be a picture (or pictures) or video that is taken by a camera of mobile device 106. Visual content 106 may include other content such as multimedia content including images, video, webpages, games, audio, interactive content, etc.

Display device 102 may be a hardware device specifically designed for viewing multimedia content including images, video, webpages, games, audio, interactive content, etc. Particularly, display device 102 may have a screen area more suitable, e.g., having a much larger screen area, for viewing visual content 106 compared to screens of portable, lightweight devices such as mobile device 108 or another display device having a smaller screen. Alternatively or additionally, display device 102 may employ technologies more suitable for viewing visual content, such as 3D, high definition, 4K, etc., technologies. In an embodiment, display device 102 may be a monitor, a television, a projector display, or any other type of display.

In an embodiment, display device 102 receives visual content 106 to be displayed from multimedia device 104 via coupling to multimedia device 104. The coupling or communication may be provided by one, or more cabling methods, such as via composite cables, Digital Visual Interface (DVI) cables, or High-Definition Multimedia Interface (HDMI) cables. In an embodiment, multimedia device 104 may be embedded or built into display device 102. In this embodiment, instead of the described cabling methods, display device 102 may receive visual content 106 from network 116 via wired (e.g., Ethernet) or wireless coupling to router/modem device 112.

Multimedia device 104 may be a computing device that manages visual content to be output or presented on display device 102. In an embodiment, multimedia device 104 may be a streaming stick or streaming player that is coupled to or integrated within display device 102. Multimedia device 104 may also be coupled to other computing devices, such as a digital video recorder (DVR) or a digital video disc (DVD) player. The coupling may be provided via a variety of cabling methods, such as via composite cables, DVI cables, or HDMI cables.

To implement traditional "mirroring" technologies for casting visual content 106, multimedia device 104 may continuously receive compressed image frames (or screen captures) from mobile device 108. Multimedia device 104 may need to expend significant computing resources to decompress received image frames before sending the frames to display device 102 for display. As result of significant computing, multimedia device 104 may result in a shortened battery life, poor responsiveness, or excessive heat generation.

Figure 2A:
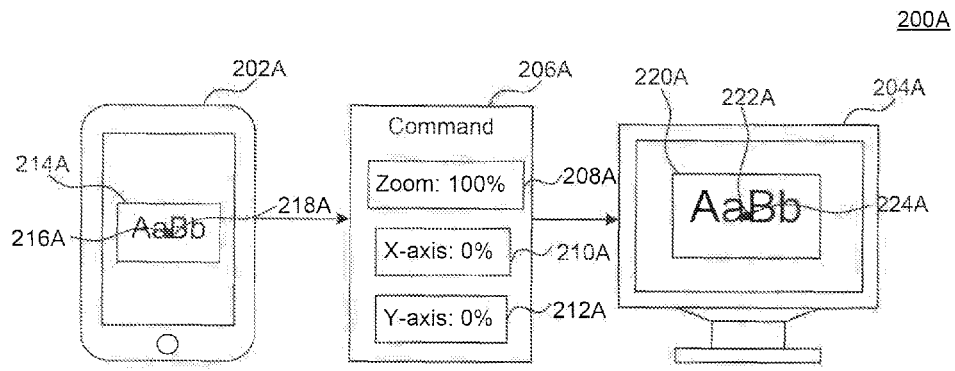
FIGS. 2A-C are diagrams illustrating how visual content are cast from mobile devices to corresponding display devices, according to an example embodiment.
Figure 2B:
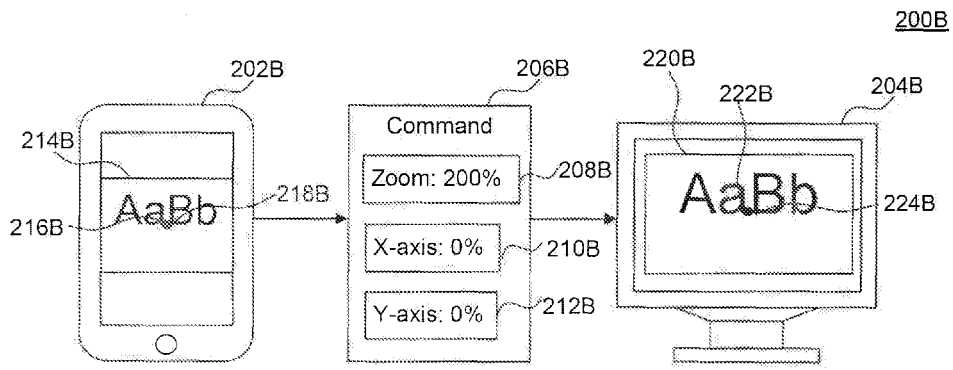
Figure 2C:
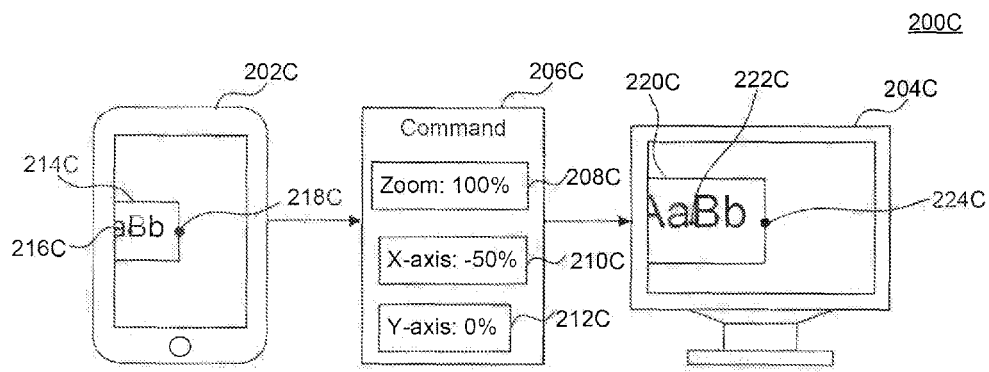
Figure 3:
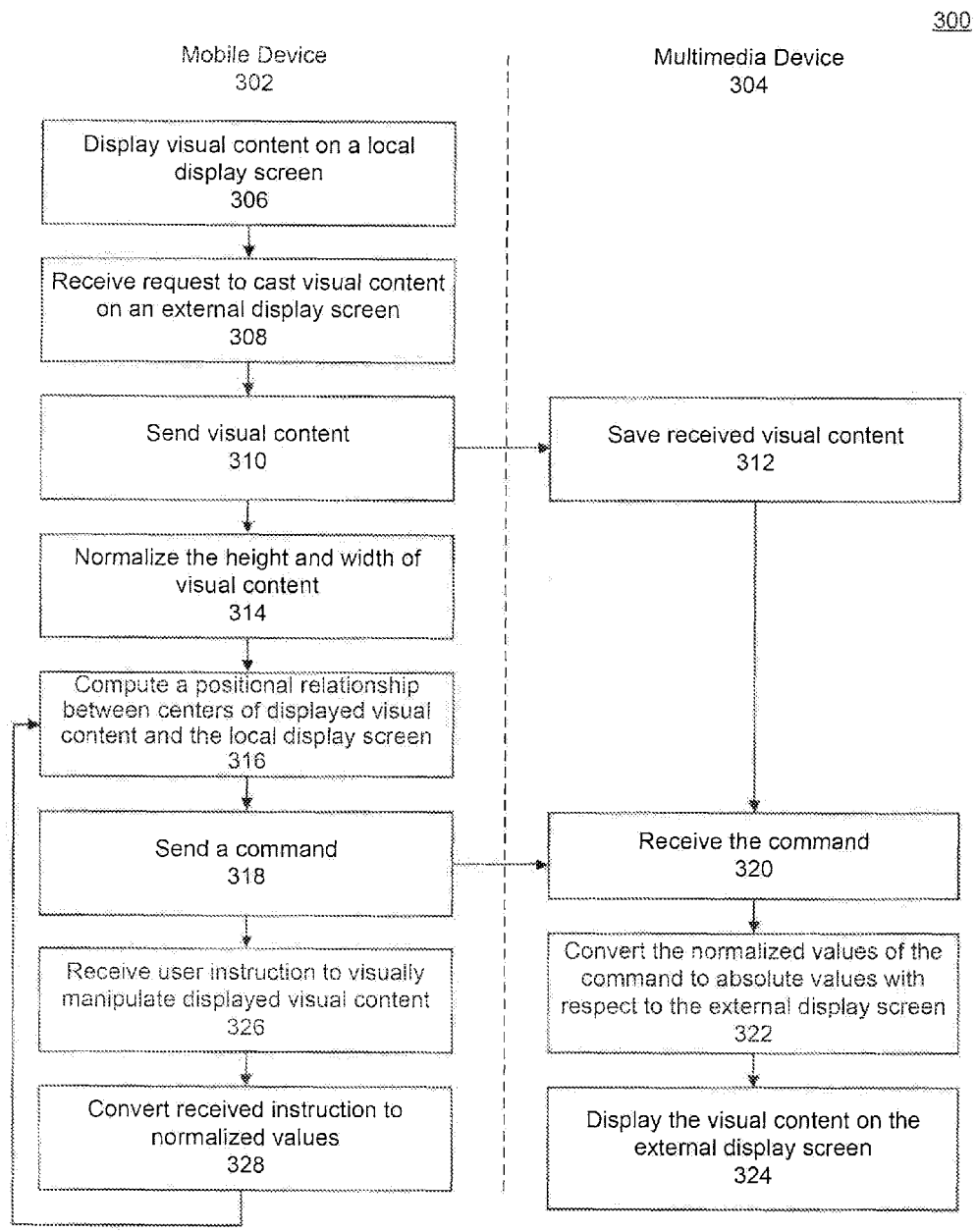
FIG. 3 is a flowchart of a method for casting interactively-controlled visual content from a mobile device to a display device, according to an example embodiment.

In an embodiment and further described with respect to FIGS. 2-3, the improved communication interface disclosed herein may require that multimedia device 104 receive visual content 106 only once and stored as visual content 105. After receipt of visual content 106, multimedia device 104 may receive a command responsive to a content consumer's interactive control of visual content 106 displayed on mobile device 108. Then, multimedia device 104 determines how to display visual content 105, received at the outset as visual content 106, on display device 102 based on the received command. A command may be a short message spanning for example tens of bytes (or other amounts that are significantly less than in tradition mirroring protocols). In contrast, "mirroring" protocols require multimedia device 102 to continuously receive and process image frames, each of which may consist of many megabytes or more (depending on the resolution of a screen of mobile device 108).

In an embodiment, mobile device 108 may download and install content casting application 110 via, for example, network 114 or the Internet. Content casting application 110 may implement a bandwidth-efficient communication interface for casting displayed visual content 106. e.g., an image, on display device 102 while enabling a content consumer to interactively control or manipulate visual content 106 displayed on mobile device 108. Content casting application 110 provides interactive control to a content consumer such that as the content consumer submits user input to visually manipulate visual content 106, application casting application 110 presents the manipulated visual content 106 on the display screens of both mobile device 108 and display device 102. Therefore, application casting application 110 causes a display screen of display device 102 to display the corresponding visual content 106 (on mobile device 108) subject to the content consumer's interactions.

To provide the bandwidth-efficient communication interface, content casting application 108 may implement the following components: network interface 118, user interface 120, and/or command generator 122. In an embodiment, mobile device 108 may include one or more processors for implementing each of these components. Each component may include a selection of stored operations that when executing in the one or more processors causes the one or more processors to perform the operations of that component.

Network interface 118 may enable content casting application 110 to access receivers and transmitters in mobile device 108 for communicating with multimedia device 104 over network 116. To implement the bandwidth-efficient communication interface, network interface 118 may send visual content 106 to multimedia device 104 for casting on display device 102. Visual content 106 may be saved locally by multimedia device 104 as visual content 105. Traditionally, content casting application 110 requests network interface 118 to continually send screen captures of the display screen such that display device 102 continues to cast or "mirror" visual content 106 displayed by mobile device 108. In an embodiment, upon sending visual content 106 to multimedia device 104 at the outset, network, interface 118 may subsequently send short commands generated by command generator 122. These short commands include information that multimedia device 104 uses to visually manipulate visual content 105, displayed on display device 102, to match the visually manipulated visual content 106 displayed on mobile device 108.

User interface 120 may detect user input, e.g., selections or gestures, made by a content consumer on a touchscreen of mobile device 108. In an embodiment, user interface 120 similarly detects user input from one or more input means, e.g., keyboard, mouse, or buttons, coupled with or implemented on mobile device 108. In an embodiment, a user input may be to cast or display visual content 106 on display device 102.

When visual content 106 is displayed on a display screen of mobile device 108, a user input or instruction may include, for example, a gesture that visually manipulates how visual content 106 is presented on the display screen. In an embodiment, visual manipulation of visual content 106 includes, without limitation, zooming in/out or panning. A content consumer typically pans visual content 106, an image, to bring a portion of the image that interests the content consumer to the center of the display screen.

Command generator 122 may generate a command based on the user input, detected by user interface 120. For example, when the user input specifies how to pan visual content 106 displayed on mobile device 108, command generator 122 rates a command representative of the panning. In an embodiment, to generate the command, command generator 122 determines the positional relationship between the center of the display screen of mobile device 108 and the of displayed visual content 106 after user input. The positional relationship may be with respect to an edge of displayed visual content 106. In an embodiment, the positional relationship may be determined with respect to the center of displayed visual content 106.

In an embodiment, command generator 122 may normalize the height and width of visual content 106. For example, instead of using absolute values, e.g., pixel lengths of visual content 106, command generator 122 may refer to normalized units, such as percentage lengths, to generate the command. The command may specify the determined or calculated positional relationship as a normalized distance between the center of the display screen of mobile device 108 and displayed visual content 106. The positional relationship may be computed based on the Cartesian coordinate system (with the center of the display screen at the origin) and include both a vertical translation and a horizontal translation. The vertical translation may be, for example, a normalized distance between the center of the display screen of mobile device and a horizontal edge of displayed visual content 106 on the y-axis. In an embodiment, the normalized distance is between the centers of the display screen and displayed visual content 106. The horizontal translation may likewise be, for example, a normalized distance between the centers on the x-axis, or between the center of the display screen and a vertical edge of displayed visual content 106.

In an embodiment, the generated command may specify the determined or calculated positional relationship as a normalized distance between the displayed visual content 106 and the center of the display screen of mobile device 108.

In an embodiment, the positional relationship may be calculated in a non-Cartesian coordinate system such as a polar coordinate system. In such a non-Cartesian system, the positional relationship may be specified as a vector including a magnitude (e.g., a radius, distance, or radial coordinate) and an angle (e.g., a polar angle, angular coordinate, or azimuth). The magnitude may be, for example, a distance between the centers with one of the centers (e.g., the center of display screen of mobile device 108) being a reference point. The angle may be, for example, the angle between the distance and a reference direction, e.g., a ray starting from the reference point.

In an embodiment, command generator 122 sends the command to multimedia device 104 whenever user interface 120 detects a user input that interactively and visually controls or manipulates displayed visual content 106. Command generator 122 may send the command by, for example, requesting network interface 118 to transmit to multimedia device 104 over network 116. In an embodiment, command generator 122 may regenerate the command as described. For example, command generator 122 may recalculate the positional relationship, which may be in normalized values, between the center of the display screen of mobile device 108 and the displayed visual content 106 after user input. In an embodiment, command generator 122 may additionally or instead generate a command specifying a change in the positional relationship discussed above. The command may be updated and sent periodically or continuously while a content consumer is continuously and interactively controlling displayed visual, content 106. In either case, content casting application 110 may send short commands to reflect how visual content 106 is being viewed on mobile device 108 instead of continuously sending bandwidth intensive or wasteful screen captures.

FIGS. 2A-C illustrate example diagrams 200A-C illustrating how visual content 214A-C on mobile devices 202A-C are casted to corresponding display devices 204A-C as visual content 220A-C, according to an example embodiment. Each of mobile devices 202A-C may be an example of mobile device 108 from FIG. 1. In an embodiment, mobile devices 202A-C may each have downloaded content casting application 110 from FIG. 1 to display visual content 214A-C on respective display devices 204A-C, each of which may be display device 102 from FIG. 1.

Diagram 200A of FIG. 2A illustrates a current position of visual content 214A displayed locally on a display screen of mobile device 202A. As shown, the center of displayed visual content 214A, (i.e., local content center 216A), happens to overlap with the center of the display screen of mobile device 202A, (i.e., local display center 218A). When a content consumer requests content casting application 110 to display visual content 214A externally on display device 204A, command generator 122 may generate command 206A including a scaling factor 208A, a horizontal translation 210A, and a vertical translation 212A. As described with respect to FIG. 1, command 206A may instead include a magnitude and an angle instead of the pair of translations 210A and 212A.

In an embodiment, displayed visual content 214A may be, un-zoomed content having an original size. Therefore, command generator 122 determines that visual content 214A is displayed at a 100% of an original size as indicated by scaling factor 208A. Command generator 122 also determines the positional relationship of local content center 216A with respect to local display center 218A, or vice versa, in terms of, for example, horizontal translation 210A and vertical translation 212A. Each of the translations may be specified in a normalized unit such as a percentage of the height or width of displayed visual content 214A.

In the example shown, since local display center 218A overlaps with local content center 218A, local content center 218A is currently 0 normalized units horizontally from local display center 218A. Local content center 218A is likewise 0 normalized units vertically from local display center 218A. In response, command generator 122 may generate, for example, horizontal translation 210A of 0% indicating that local content center 216A is shifted by 0% of the width of visual content 214A from local center display 218A on the x-axis. Similarly, command generator 122 may generate, for example, vertical translation 212A of 0% indicating that local content center 216A is shifted by 0% of the height of visual content 214A from local center display 218A on the y-axis. In an embodiment, each of translations 210A and 212A may include information specifying a direction of the translation. For example, a positive or negative normalized unit may indicate a translation on an axis (e.g., x-axis or y-axis) in the positive, or negative direction, respectively.

In an embodiment, content casting application sends command 206A to a multimedia device, such as multimedia device 104 of FIG. 1, coupled to display device 204A. The multimedia device may operate on a local copy of visual content 214A, stored as visual content 105 in multimedia device 104, to display visual content 220A externally on display device 204A. The multimedia device may display visual content 220A base on received command 206A such that the positional relationship calculated by command generator 122 is maintained on a display screen of display device 204A between, the center of displayed visual content 220A (i.e., external content center 222A) and the center of the display screen of display device 204A (i.e., external display center 224A). As shown, multimedia device 104 determines that horizontal translation 210A and vertical translation 212A together indicates that external content center 222A overlaps with external display center 224A.

Diagram 200B of FIG. 2B illustrates a current position of visual content 214B displayed locally on a display screen of mobile device 202B. As shown, a content consumer of mobile device 202B may have zoomed into or magnified a portion of displayed visual content 214B as compared to visual content 214A displayed by mobile device 202A. User interface 120 within an operating content casting application 108 may detect the user's zoom instruction based on, for example, a reverse-pinching gesture on the display screen of mobile device 202B.

Responsive to the user gesture, content application 108 may magnify displayed visual content 214B as shown. Additionally, command generator 122 may generate command 206B reflecting scaling factor 208B of 200% indicating that visual content 214B has been magnified 200% from an original size. In an embodiment, because the content consumer did not pan visual content 214B displayed by mobile device 202B, local content center 216B remains overlapped with local display center 218B. Therefore, command generator 122 may generate values for horizontal translation 210B and vertical translation 212B that are similar to the generated values for horizontal translation 210A and vertical translation 212B, respectively. In an embodiment, instead of generating absolute, recalculated values, command generator 122 may generate a change in, scaling factor 208B in the command.

It an embodiment, the multimedia device receives and processes command 206B and scales or magnifies a local copy of visual content 214B, e.g., visual content 105 of FIG. 1, according to scaling factor 208B. Then, the multimedia device may send the scaled visual content to be displayed as visual content 220B on display device 204B. Similar to visual content 220A displayed on display device 204A, visual content 220B is displayed such that external content center 222B overlaps external display center 224B. This is because in this embodiment, horizontal translation 210B and vertical translation 212B indicate that external content center 222B has been shifted 0 normalized units from external display center 224B on the x-axis and the y-axis, respectively.

In an embodiment, by operating on normalized units, the multimedia device displays visual content 220B independently of the aspect ratios of display device 202B, visual content 214B, and display device 204B. Therefore, the multimedia device may take advantage of the size, resolution, or aspect ratio of display device 204B to display more portions of visual content 214B as visual content 220B. For example, the leftmost and rightmost portions of displayed visual content 214B have been omitted (i.e., off-screen) due to the aspect ratio and width length of the screen of mobile device 202B. In contrast, display device 204B may be capable of displaying visual content 214B in its entirety as visual content 220B, including the leftmost and rightmost portions omitted locally on mobile device 202B.

Diagram 200C of FIG. 2C illustrates a current position of visual content 214C displayed locally on a display screen of mobile device 202C. In an embodiment, a content consumer of mobile device 202C may have panned visual content 214C to view the rightmost portion of visual content 214C. In an embodiment, on a touchscreen interface, the content consumer may pan by, for example, scrolling or dragging the rightmost portion of visual content 214C to the center of the display screen of mobile device 202C (i.e., local display center 218C). As shown, the center of display visual content local content center 216C) is directly to the left of local display center 218C. In an embodiment, local content center 216C may be off-screen.

In an embodiment, responsive to user instruction or palming, command generator 122 may generate command 206C including scaling factor 208C, horizontal translation 210C, and vertical translation 212C, in an embodiment, scaling factor 208C may be 100% because visual content 214C was not zoomed in or out. In an embodiment, command generator 122 may determine horizontal translation 210C as −50% representing that 50% of the width of visual content 214C has been shifted to the left of local display center 218C (i.e., in the negative direction on the x-axis) with respect to local content center 216C. Similarly, command generator 122 may determine vertical translation 212C as 0% because 0% of the height of visual content 214C has been shifted up from local display center 218 (i.e., in the positive direction on the y-axis) with respect to local content center 216C. Responsive to receiving command 206C, the multimedia device (coupled to display device 204C) may process a local copy of visual content 214C, such as visual content 105 of multimedia device 104 from FIG. 1, to display visual content 220C. In an embodiment, the multimedia device 104 may send to or cause display device 204C to display visual content 220C that visually maintains the positional relationship specified in command 206C. As shown, external content center 222C has been shifted 50% of the width of visual content 220C to the left of external display center 224C. External content center 222C has also been shifted 0% of the height of visual content 220C up from external display center 224C.

As described with respect to FIG. 2B, since the normalized values allow display device 204C to display visual content 220C independently of displayed visual content 214C, more portions of visual content 214C may be displayed by display device 204C. For example, a portion of "A" missing from displayed visual content 214C can be seen in displayed visual content 220C on display device 204C.

In an embodiment, with respect to FIGS. 2A-C, command generator 122 may determine the positional relationship between local display center 218 and visual content 214 based on another point of reference within visual content 214. In an embodiment, the positional relationship may be determined with respect to local display center 218 and an edge of visual content 214. For example with respect to FIG. 2A, horizontal translation 210A may be 50% indicating that 50% of visual content 214A is to the left of local display center 218A. This positional relationship specifies that the normalized distance between local display center 218A and a vertical edge (e.g., the left vertical edge) of visual content 214A is 50 units, e.g., 50%. Similarly, vertical translation 212A may be 50% indicating that the normalized distance between local display center 218A and a horizontal edge (e.g., bottom horizontal edge) of visual content 214A is 50 units, e.g., 50%.

In an embodiment, each of diagrams 200A-C shows that visual content 220 is displayed on display device 204 with respect to external, display center 224, i.e., using a center-oriented coordinate system. But, display device 204 may manipulate visual content based on a corner-orientated display coordinate system. In such an embodiment, the multimedia device may manage and maintain the center-oriented coordinates locally. Upon receipt of command 206, the multimedia device may apply command 206 to the locally stored visual content to generate manipulated visual content. Then, the multimedia device may send the manipulated visual content to display device 204 for displaying. In an embodiment, the multimedia device may convert the visual content into units and format of the corner-oriented display coordinate system used by display device 204. In an embodiment, the multimedia device may convert command 206 to units and format of the corner-oriented display coordinate system prior to applying to stored visual content.

FIG. 3 is a flowchart of a method 300 for casting interactive-controlled, visual content from mobile device 302 to a display device via multimedia device 304. Method 300 can be performed by processing logic that may comprise hardware (e.g., circuitry, dedicated logic, programmable logic, microcode, etc.), software (e.g., instructions running on a processing device), or a combination thereof. In an embodiment, mobile device 302 and multimedia device 304 may be example implementations of mobile device 108 and multimedia device 104 from FIG. 1, respectively.

In step 306, a content casting application, such as content casting application 110 implemented or mobile device 302, displays visual content on a local display screen, i.e., a display screen of mobile device 302. In an embodiment, a user interface, such as user interface 120 of FIG. 1, within the content casting application may present the visual content to a content consumer operating mobile device 302. The visual content may be, for example, a video or picture taken by a camera of mobile device 302.

In step 308, the user interface receives a request from the content consumer to cast the visual content from mobile device 302 to an external display screen, i.e., a display screen coupled to multimedia device 304.

In step 310, responsive to the request of step 308, a network interface, such as network interface 118, within the content casting application sends the visual content to multimedia device 304.

In step 312, multimedia device 304 saves the received visual content as, for example, visual content 105 from FIG. 1. In an embodiment, multimedia device 304 may process and apply received commands to the locally saved visual content for displaying on the display screen coupled to multimedia device 304. In an embodiment, receiving the visual content at the outset and processing received subsequent commands allow multimedia device 304 to display the visual content on an external display screen without the bandwidth-intensive "mirroring" technology commonly in use today.

In step 314, a command generator, such as command generator 122, within the content casting application normalizes the height and width of the visual content. For example, the command generator may convert a pixel height and width to respective percentages of the height and width.

In step 316, the command generator computes or determines a positional relationship between the center of the displayed visual content and the display screen, i.e., local display screen, of mobile device 302. In an embodiment, the positional relationship may include a horizontal and a vertical translation of the center of the visual content with respect to a reference point (e.g., the center or a point on an edge) of the local display screen. For example, the command generator may generate the command as described with respect to commands 206A-C from FIG. 2. The command may include normalized values such that multimedia device 304 processes and displays the visual content independently of the aspect ratio, size, or resolution of the local display screen of mobile device 302.

In step 318, the command generator sends a command to multimedia device 304. The command may include the computed positional relationship of step 316. In an embodiment, the command may also include instructions indicating how the visual content has been visually manipulated by a content consumer. For example, the command may also include a scaling factor, such as scaling factor 208 of FIG. 2, indicating that the content consumer has zoomed in or out of the displayed visual content on mobile device 302.

In step 320, multimedia device 304 receives the command. The command may include, for example, normalized values describing a scaling factor, a horizontal translation, or a vertical translation.

In step 322, multimedia device 304 converts the normalized values of the command to absolute values with respect to the external display screen. For example, multimedia device 304 may convert a horizontal translation received as a percentage to a pixel distance with respect to the saved visual content of step 312 and the coupled display screen external to mobile device 302. In an embodiment, multimedia device 304 may receive attributes of the external display screen from a display device, such as display device 102 coupled to multimedia device 104. The attributes may include, for example, an aspect ratio, a resolution, or a dimension of the display screen of the display device.

In an embodiment, an attribute may include which coordinate system the display device uses to display the visual content. To correctly display the visual content on the display screen, multimedia device 304 may convert the units of the received command of step 320 to units and the format of the coordinate system, such as a corner-oriented display coordinate system, used by the display device.

In step 324, multimedia device 304 displays the visual content on external display screen based on the converted normalized values of step 322. In an embodiment, multimedia device 304 may send the converted visual content to the coupled display device for displaying on a display screen external to mobile device 302. In an embodiment, the display device may itself be capable of processing commands for visually manipulating the visual content. In this case, multimedia device 304 may send a converted command instead.

In step 326, the user interface receives or detects user instruction to visually manipulate visual content displayed locally on mobile device 302. In an embodiment, the user's instruction may be to zoom in, zoom out, or pan the displayed visual content in a specific direction by a specific distance or amount. For example, the user interface may detect a user gesture such as a pinching or dragging motion within a touchscreen of mobile device 302. As will be appreciated, the user may specify other instructions for manipulating the visual content and such other instructions are within the scope and spirit of the embodiments described herein.

In step 328, the command generator converts the received instruction to normalized values. For example, the content consumer may have pinched the visual content by three centimeters or 200 pixels. In an embodiment, the command generator may convert an absolute value of the received instruction into a normalized value, such as percentage of the height or width of the visual content. Then, method 500 proceeds back to step 316.

In an embodiment, responsive to interactive input from the content consumer in step 326, the content casting application generates short commands via steps 328 and 316 for sending to multimedia device 304 in step 318.

Figure 4:
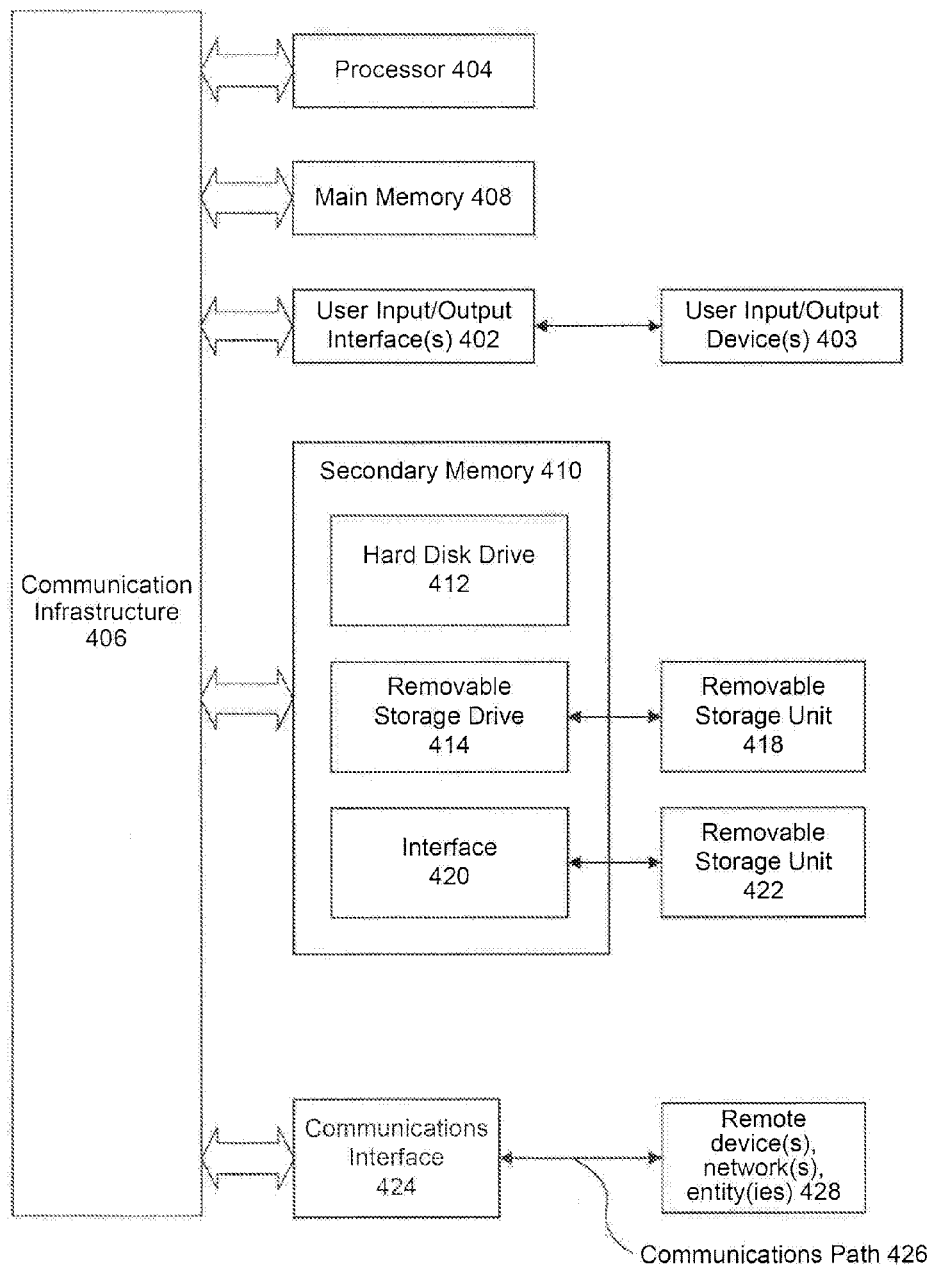
FIG. 4 is a diagram illustrating an example computing system, according to an embodiment.

Various embodiments, such as mobile device 201 of FIG. 2 or devices of FIG. 1, can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main, or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable, storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described, herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
sending, by a computing device, visual content displayed on a first display screen of the computing device to a multimedia device for displaying on a second display screen;
receiving, by the computing device, an instruction that visually manipulates how the visual content is displayed on the first display screen;
generating, by the computing device, a command representative of the instruction, wherein the command specifies a positional relationship between the center of the first display screen and the visual content displayed on the first display screen, wherein the positional relationship includes at least one of a horizontal translation and a vertical translation of the panned visual content, wherein the horizontal translation is a normalized horizontal distance between the center of the first display screen and a vertical edge of the panned visual content on the first display screen, and wherein the vertical translation is a normalized vertical distance between the center of the first display screen and a horizontal edge of the panned visual content on the first display screen; and
sending, by the computing device, the command to the multimedia device that causes the second display screen to display the visual content according to the positional relationship.

2. The method of claim 1, wherein the multimedia device stores the visual content, and wherein the multimedia device manipulates the stored visual content for displaying on the second display screen such that the positional relationship is maintained with respect to the center of the second display screen and the visual content displayed on the second display screen.

3. The method of claim 1, wherein the command enables the multimedia device to display the visual content on the second display screen independent of an aspect ratio and a resolution of the first display screen.

4. The method of claim 1, wherein the instruction specifies a zooming factor that changes how much of the visual content is displayed on the first display screen, and wherein the command includes an indication of the zooming factor.

5. The method of claim 1, further comprising:
normalizing the height and the width of the visual content, wherein the positional relationship is specified relative to the normalized height or the width.

6. The method of claim 1, wherein the instruction pans the visual content displayed on the first display screen, wherein the positional relationship includes both the horizontal translation and the vertical translation of the panned visual content.

7. The method of claim 6, wherein the normalized horizontal distance is specified as a percentage of the width of the panned visual content, and wherein the normalized vertical distance is specified as a percentage of the height of the panned visual content.

8. The method of claim 1, wherein the instruction pans the visual content displayed on the first display screen, wherein the positional relationship includes a horizontal translation and a vertical translation of the panned visual content, and wherein the generating the command comprises:
computing the horizontal translation as a normalized horizontal distance between the center of the first display screen and the center of the panned visual content on the first display screen; and
computing the vertical translation as a normalized vertical distance between the center of the first display screen and the center of the panned visual content on the first display screen.

9. The method of claim 1, further comprising:
receiving the instruction as a gesture on a touchscreen of the computing device.

10. A system, comprising:
a memory storing visual content;
a first display screen that displays the visual content;
at least one processor coupled to the memory;
a network interface that when executing in the at least one processor sends the visual content displayed on the first display screen to a multimedia device for displaying on a second display screen;
a user interface that when executing in the at least one processor receives an instruction that visually manipulates the visual content displayed on the first display screen; and
a command generator that when executing in the at least one processor:
generates a command representative of the instruction, wherein the command specifies a positional relationship between the center of the first display screen and the visual content displayed on the first display screen, wherein the positional relationship includes at least one of a horizontal translation and a vertical translation of the panned visual content, wherein the horizontal translation is a normalized horizontal distance between the center of the first display screen and a vertical edge of the panned visual content on the first display screen, and wherein the vertical translation is a normalized vertical distance between the center of the first display screen and a horizontal edge of the panned visual content on the first display screen; and
sends, to the multimedia device, the command that modifies the visual content displayed on the second display screen according to the positional relationship.

11. The system of claim 10, wherein the multimedia device stores the visual content, and wherein the multimedia device manipulates the stored visual content for displaying on the second display screen such that the positional relationship is maintained with respect to the centers of the second display screen and the visual content displayed on the second display screen.

12. The system of claim 10, wherein the command enables the multimedia device to display the visual content on the second display screen independent of an aspect ratio and a resolution of the first display screen.

13. The system of claim 10, wherein the instruction specifies a zooming factor that changes how much of the visual content is displayed on the first display screen, and wherein the command includes the zooming factor.

14. The system of claim 10, wherein the command generator further:
normalizes the height and the width of the visual content, wherein the positional relationship is specified relative to the normalized height and width.

15. The system of claim 10, wherein the instruction pans the visual content displayed on the first display screen, wherein the positional relationship includes both the horizontal translation and the vertical translation.

16. The system of claim 15, wherein the normalized horizontal distance is a percentage of the width of the visual content, and wherein the normalized vertical distance is a percentage of the height of the visual content.

17. The system of claim 10, wherein the user interface further:
receives the instruction as a gesture on a touchscreen of the computing device.

18. A tangible computer-readable device having instructions stored thereon that, when executed by at least one computing device, causes the at least one computing device to perform operations comprising:
sending, by a computing device, visual content displayed on a first display screen of the computing device to a multimedia device for displaying on a second display screen;
receiving, by the computing device, an instruction that visually manipulates how the visual content is displayed on the first display screen;
generating, by the computing device, a command representative of the instruction, wherein the command the command specifies a positional relationship between the center of the first display screen and the visual content displayed on the first display screen, wherein the positional relationship includes at least one of a horizontal translation and a vertical translation of the panned visual content, wherein the horizontal translation is a normalized horizontal distance between the center of the first display screen and a vertical edge of the panned visual content on the first display screen, and wherein the vertical translation is a normalized vertical distance between the center of the first display screen and a horizontal edge of the panned visual content on the first display screen; and
sending, by the computing device, the command to the multimedia device that causes the second display screen to display the visual content according to the positional relationship.

19. A method, comprising:
receiving, by a multimedia device, from a computing device visual content for displaying on a second display screen, wherein the visual content is displayed on a first display screen of the computing device;
receiving, by the multimedia device, from the computing device, a command that represents an instruction that visually manipulates how the visual content is displayed on the first display screen, wherein the command specifies a positional relationship between the center of the first display screen and the visual content displayed on the first display screen, wherein the positional relationship includes at least one of a horizontal translation and a vertical translation of the panned visual content, wherein the horizontal translation is a normalized horizontal distance between the center of the first display screen and a vertical edge of the panned visual content on the first display screen, and wherein the vertical translation is a normalized vertical distance between the center of the first display screen and a horizontal edge of the panned visual content on the first display screen;
applying, by the multimedia device, the command to the received visual content to generate a manipulated visual content; and
sending, by the multimedia device, the manipulated visual content to a display device for displaying on the second display screen.

20. The method claim 19, wherein the instruction pans the visual content displayed on the first display screen, wherein the positional relationship includes both the horizontal translation and the vertical translation.

\* \* \* \* \*